United States Patent [19]
Yamamoto et al.

[11] 4,256,494
[45] Mar. 17, 1981

[54] ERASABLE INK COMPOSITION FOR WRITING ON AN IMPERVIOUS SURFACE

[75] Inventors: Masaji Yamamoto, Amagasaki; Keiko Shioi, Daito; Kimio Murakami, Osaka, all of Japan

[73] Assignee: Sakura Color Products Corp., Osaka, Japan

[21] Appl. No.: 87,924

[22] Filed: Oct. 25, 1979

[30] Foreign Application Priority Data

Oct. 20, 1978 [JP] Japan ................. 53-129869
Dec. 28, 1978 [JP] Japan ................. 53-162724

[51] Int. Cl.$^3$ ............................................. C09D 11/00
[52] U.S. Cl. ................................... 106/22; 106/23; 106/27; 106/28; 106/31; 260/28.5 R; 260/28.5 A; 260/28.5 AV; 260/28.5 D
[58] Field of Search ............... 106/22, 23, 27, 28, 106/31; 260/28.5 R, 28.5 AV, 28.5 A, 28.5 D

[56] References Cited

U.S. PATENT DOCUMENTS 4,023,974  5/1977  Handl ........................... 106/31
4,042,401  8/1977  Newman et al. ............... 106/31

Primary Examiner—Melvyn I. Marquis
Attorney, Agent, or Firm—Wenderoth, Lind & Ponack

[57] ABSTRACT

An erasable ink composition for writing or marking on an impervious surface which comprises: about 40–90% by weight of an organic solvent; about 1–10% by weight of a pigment; about 1–25% by weight of a separating agent which is soluble in the solvent, and is a non-volatile or only slightly volatile liquid at normal temperatures having a lower vapor pressure than the solvent; about 0.5–20% by weight of a synthetic resin which is soluble both in the solvent and a solution of the separating agent in the solvent, and is insoluble or only slightly soluble in the separating agent; and about 0.05–20% by weight of a hydrocarbon wax.

7 Claims, No Drawings

ERASABLE INK COMPOSITION FOR WRITING ON AN IMPERVIOUS SURFACE

The present invention relates to an erasable ink composition for writing on an impervious surface. More particularly, the present invention relates to an ink composition which permits writing on an impervious or non-absorptive surface such as a sheet of synthetic resin, metal, glass and enamel, and is erased readily by wiping with cloth or paper.

Such an ink composition is used for a so-called marking pen which usually comprises a holder having an ink chamber therein and a felt-tip at the top thereof communicating with the ink chamber, and is so formulated as to dry quickly on an impervious, white or colored writing surface known as a white board when writing, thereby forming writings or markings thereon, and can be erased readily by wiping with cloth or paper. Therefore, a conventional ink composition for a marking pen usually includes a pigment, a resin, and optionally other ingredients, dissolved or dispersed in an organic solvent having a relatively low boiling point. The ink composition thus has a general tendency to clog the felt-tip with the pigment and the resin deposited from the ink composition when the tip is left standing for many hours with no cap thereon as the solvent evaporates from the tip. That is, the deposited pigment and resin in the ink composition prevent a smooth flow of ink from the tip, and makes writings or markings thereof on the white board thin and unclear. Finally, the pen "dries up," and writing becomes impossible.

In order to obviate the above disadvantage, Japanese Patent Publication No. 52-44244 proposes an erasable ink composition which comprises an organic solvent, a pigment, a resin, a liquid aliphatic dicarboxylic acid diester and an α-olefin of 20-28 carbons. According to the publication, the diester plasticizer should not substantially dissolve the resin, and should not be substantially dissolved in the solvent. This permits a film of plasticized resin to form on the surface of a felt-tip when the tip is left standing without a cap, thus preventing further evaporation of the solvent, and also permits such a film to form on a white board upon writing thereon, thus being readily erased by wiping. These formulations, however, are apt to cause non-uniformity of the ink composition since the plasticizer has a poor affinity to the solvent. Furthermore, the film will not be sufficiently stable for preventing the evaporation of the solvent.

It is, therefore, an object of the present invention obviate the disadvantages involved in the prior arts, and to provide an improved erasable ink composition for writing on an impervious surface such as a white board, which can be readily erased by wiping with cloth or paper.

Other objects and features of the present invention will be apparent from the following description thereof.

The ink composition of the present invention comprises a solvent, a pigment, a separating agent of non-volatile or only slightly volatile liquid which is soluble in the solvent and has a lower vapor pressure than the solvent, a synthetic resin which is soluble both in the solvent and a solution of the separating agent in the solvent and is insoluble or only slightly soluble in the separating agent, and a hydrocarbon wax.

The solvent used in the invention includes any solvent which has been heretofore used for producing a conventional ink composition for a marking pen, and is not specifically limited. However, preferably used solvents are, for example, a lower alkyl ketone such as methyl ethyl ketone and methyl isobutyl ketone, a lower aliphatic alcohol ester of a lower fatty acid such as ethyl acetate, butyl acetate and butyl propionate, an aromatic hydrocarbon such as benzene, toluene and xylene, a lower aliphatic alcohol such as ethanol, propanol and butanol, a lower alicyclic alcohol such as cyclohexanol, a glycol monoalkyl ether such as ethylene glycol monomethyl ether and methoxybutanol, and a mixture thereof. The solvent is usually contained in an amount of about 40-90% by weight, preferably about 65-85% by weight, based on the ink composition.

The term "pigment" in the invention means a pigment, a processed pigment, and a dye which is not soluble in the solvent. Either an inorganic pigment or an organic pigment can be used in the invention which have been heretofore used for an ink composition for a marking pen so far as the pigment is uniformly dispersed in the solvent with other ingredients. The processed pigment is a dispersion of a pigment in a resin usually in a ratio of about 1:1, and accordingly it is readily dispersed uniformly in the solvent. Therefore, the processed pigment is advantageously used in the invention since a step for mixing the pigment with the resin in the solvent is omitted. Some examples of preferred processed pigments are Euvi Print Black X60, Blue 704 and Orange 331A sold by BASF, Microlith Black C-KT and Red BR-K sold by CIBA, Fuji IK Black and Blue sold by Fuji Shikiso K. K., and the like.

Dyes such as a dispersed dye and a vat dye may be used as the pigment since they are insoluble in the organic solvent.

Although the content of the pigment in the ink composition of the invention varies depending upon the pigment used and shade required on the white board, the content of the pigment is usually about 1-10% by weight based on the ink composition.

The hydrocarbon waxes preferably used in the invention are paraffin wax, microcrystalline wax, polyethylene wax of molecular weight of about 1000-10000, ceresine, α-olefin, and a mixture of these waxes. The polyethylene wax includes a modified wax thereof, for example, a wax modified by ultraviolet ray irradiation. The content of the wax in the ink composition is determined so as to form a thin solid film on the surface of a felt-tip when the tip is left standing without a cap. Therefore, an optimum content of the wax is dependent on the solvent used, the content thereof, ambient temperatures, etc. The wax, however, may be contained in a slightly excess amount in the ink composition, since the film formed is readily broken, for example, by writing pressure, upon writing, even when the film is formed immediately upon removing the cap from the felt-tip.

In general, the wax is contained in an amount of about 0.05-20% by weight based on the ink composition. This formulation has been found to form a film which effectively prevents further evaporation of the solvent when a felt-tip is left standing without a cap.

On the other hand, when containing less than about 0.05% by weight of the wax based on the ink composition, the ink composition readily dries up, and when containing more than about 20% by weight, the ink composition has too high a viscosity, thus resulting in a bad flow of ink from a tip when writing.

However, more preferably, when paraffin wax, microcrystalline wax, polyethylene wax or ceresine is used as a hydrocarbon wax, they are contained in an amount of 0.05-15% by weight, and even more preferably, about 0.1-5% by weight, and most preferably, about 0.2-3% by weight, based on the ink composition.

An α-olefin used in the present invention is one that melts at temperatures of about 30°-80° C., preferably about 40°-70° C. According to the experiments conducted by the inventors, an α-olefin or a mixture of α-olefins which melt at temperatures of about 30°-80° C. has at least 22 carbons, and at most about 34-36 carbons.

The use of α-olefin which melts at a temperature below about 30° C. is not desirable since they might be liquid in summer, thus not forming a solid film on the surface of the tip. In turn, the α-olefin which melts at a temperature higher than about 80° C. may cause the gellation of the ink composition, and thus the use thereof is to be avoided.

The α-olefins used in the invention are more soluble in the solvent than the previously mentioned hydrocarbon waxes, and therefore, are contained preferably in a larger amount than the other hydrocarbon waxes. On the other hand, the α-olefin having a fewer number of carbons is more soluble in the solvent than the α-olefin having a larger number of carbons. Thus, the optimum content of the α-olefin in the ink composition varies depending upon the α-olefin used as well as the solvent used and the amount thereof in the ink composition. Preferably, therefore, the content of the α-olefin is about 0.5-20% by weight based on the ink composition, and more preferably, 0.5-10% by weight.

In more detail, for example, a mixture mainly comprising α-olefins of 20-28 carbons, sold by Mitsubishi Kasei Kogyo K. K. under the name of "Dialene 208," is preferably used in an amount of about 5-20% by weight based on the ink composition. However, since "Dialene 30" mainly comprising α-olefins of not less than 30 carbons is less soluble in the solvent, a satisfying result is obtained when the ink composition contains only about 0.5-0.8% by weight based on the ink composition.

According to the invention, the most preferably used α-olefin is one that melts at temperatures of about 40°-70° C., which corresponds to an α-olefin having 22-36 carbons or a mixture of such α-olefins.

The ink composition of the invention includes a synthetic resin for forming a stable dispersion of the pigment in the solvent as well as for providing a suitable viscosity to the resulting ink composition and a suitable adhesion on an impervious surface such as a white board on writing. Thus, the resin is contained in an amount of about 0.5-20% by weight, preferably 3-15% by weight, based on the ink composition. According to the invention, the resin should be soluble both in the solvent and a solution of a separating agent, which will be hereinafter described, in the solvent, and is insoluble or only slightly soluble in the separating agent so that the ink remains a stable and uniform dispersion for a long period of time, and also so that a liquid film which substantially comprises the separating agent is formed on an impervious surface when writing.

Some examples of the resins which will meet these requirements are a vinyl polymer such as polyvinyl butyral, vinyl chloride-vinyl acetate copolymer, vinylidene chlorideacrylonitrile copolymer, and a mixture of these polymers, and a cellulose polymer such as ethyl cellulose, acetyl cellulose and a mixture of these polymers. A mixture of one or more of the vinyl polymers and one or more of the cellulose polymers also may be used, if desired.

The separating agent is a non-volatile or only slightly volatile liquid with a lower vapor pressure than that of the solvent used at normal temperatures of about 0°-50° C., and is soluble in the solvent used. Preferably used separating agents are a higher fatty acid ester, a phthalic acid diester, a glycol, glycerine, a higher aliphatic alcohol, a higher aliphatic alcohol monoether of ethylene glycol and diethylene glycol, liquid paraffin, and a mixture of these.

In more detail, the higher fatty acid ester preferably used in the invention consists of a fatty acid of 12-22 carbons and a lower aliphatic alcohol of 1-5 carbons, among which are, for example, ethyl stearate, methyl palmitate, ethyl oleate, and a mixture thereof. The phthalic acid diester preferably used in the invention is a diester of an aliphatic alcohol of 4-13 carbons such as dibutyl phthalate, dioctyl phthalate, dilauryl phthalate, ditridecyl phthalate, and a mixture thereof.

The glycol used in the invention includes a dihydric alcohol having 2-8 carbons therein which is liquid at the normal temperatures such as ethylene glycol, propylene glycol, butylene glycol, hexylene glycol, 2,5-hexanediol, 1,7-heptanediol, and a mixture thereof. The glycol further includes a polyoxyalkylene glycol such as polyethylene glycol of molecular weight not larger than about 600, inclusive of diethylene glycol and triethylene glycol, polypropylene glycol of molecular weight not larger than about 5000, inclusive of dipropylene glycol and tripropylene glycol, and polyethylene polypropylene glycol, a copolymer of ethylene oxide and a propylene oxide, of molecular weight not larger than about 5000.

The higher aliphatic alcohol monoether of ethylene glycol and diethylene glycol is also a preferable separating agent used in the invention. The ether compound is such that it has an alkyl of 8-22 carbons, and some examples thereof are monooctyl ether and monolauryl ether.

The aliphatic alcohol used in the invention is not specifically limited so far as it is non-volatile or only slightly volatile at the normal temperatures, and it may be either linear or branched, and also may be either saturated or unsaturated. However, preferably used alcohols are saturated or unsaturated fatty alcohols having 8-22 carbons, among which are, for example, octyl alcohol, capryl alcohol, oleyl alcohol, octyldodecanol, and a mixture of these.

The separating agent is contained in an amount of about 1-25% by weight, preferably about 2-15% by weight, based on the ink composition. The ink composition containing less than about 1% by weight of the separating agent is not readily erased by a light mechanical abrasion, or wiping. On the other hand, the ink composition containing more than about 25% by weight of the separating agent does not quickly dry on a white board and will result in unclear and lusterless writings or markings on a white board.

A method for producing the ink composition of the invention will now be described. However, the following method is for illustrative purposes only, and is not to be construed to limit the scope of the invention.

A finely divided pigment is mixed thoroughly with a solvent to form a uniform dispersion. To the dispersion is added a powdered resin, mixed thoroughly therewith to dissolve the resin in the solvent. Then, a separating agent and a max or an α-olefin are added to the resultant mixture, mixed thoroughly, to provide the ink composition of the invention. If necessary, the mixture is heated to a temperature of, for example, about 40°-60° C. while stirring. The order of mixing and means for mixing are not critical in the present invention.

According to the invention, since the ink composition includes the wax or the α-olefin in such an amount that the wax or the α-olefin deposits and forms a thin solid film on the surface of a felt-tip when only a slight portion of the solvent near the surface of the tip evaporates therefrom, there occurs no "drying-up" even in the case that the tip is left standing for a long time with a cap removed therefrom. When writing, after being left standing for a long time with no cap, the film formed on the surface of the tip is readily broken by writing pressure and dissolution of the film by the solvent inside the film, and thus there is no difficulty caused on writing. Friction heat generated on writing might be another reason for smooth writing after a long period of standing with no cap.

The film may be formed on a tip immediately when a cap is removed from the tip, depending upon the wax or the α-olefin used, the content thereof, the solvent used and the content thereof. However, as just described above, the film is readily broken when writing, thus not causing any obstacle.

Furthermore, in the ink composition of the invention, the separating agent and the resin are both soluble in the solvent, so that the ink composition remains a uniform dispersion even when it is unused for a long period of time, contrary to the prior art ink composition as hereinbefore mentioned.

The ink composition of the invention has a further advantage in that it is readily erased by wiping with cloth or paper. The resin is soluble in a solution of the separating agent in the solvent, but is insoluble or only slightly soluble in the separating agent. Therefore, when writing or marking is made on an impervious surface and the solvent has evaporated therefrom, the separating agent will form a thin liquid film on the surface, and most of the pigment, the resin and the wax or the α-olefin remain on that film, thereby forming writings or markings on the surface. Thus, as is apparent, the writings or markings are readily removed or erased from the surface by light mechanical abrasion or wiping by cloth or paper.

The present invention will be more cleanly understood with reference to the following examples.

In the examples, a general procedure for preparing the ink compositions of the invention is as follows.

A finely divided pigment was added to an organic solvent followed by stirring the resultant mixture for about 30 minutes by the use of a stirring device of 1000-2000 rpm, to provide a uniform dispersion. To the mixture thus obtained was then added a powdered resin, the mixture was stirred for about one hour at a temperature of about 40°-60° C., so as to dissolve the resin in the mixture. Then, either a wax or an α-olefin, and a separating agent, were added to the mixture, and stirred for another 30 minutes at the same temperature as above, thus to provide an ink composition of the invention.

In the examples, amounts of the ingredients are expressed as % by weight.

Each of the ink compositions thus prepared was then charged in an ink chamber in a holder of a marking pen which has a felt-tip at the end with a cap carried therewith. The cap was then removed from the felt-tip, and the marking pen was allowed to stand in a windless circumstance at a temperature of 25° C. and under a relative humidity of 60%, writing with the pen on an impervious resin surface at intervals of 5 minutes, thereby to estimate a period of time until the pen "dried up," when the writings became remarkably unclear and a smooth writing became difficult. This period of time is shown as a drying-up time.

EXAMPLE 1

| Pigment | Permenant Red F4R[1] | 3.0% |
|---|---|---|
| Resin | vinylidene chloride copolymer[2] | 2.0% |
| Solvent | methyl isobutyl ketone | 38.0% |
| | methyl ethyl ketone | 45.0% |
| Separating agent | n-butyl stearate | 7.0% |
| | n-butyl palmitate | 2.0% |
| Wax | 115° F. paraffin | 3.0% |
| Drying-up time of 20 min. | | |

EXAMPLE 2

| Pigment | carbon black[3] | 3.0% |
|---|---|---|
| Resin | vinyl chloride-vinyl acetate coploymer[4] | 5.0% |
| Solvent | methyl isobutyl ketone | 45.0% |
| | ethyl acetate | 36.0% |
| Separating agent | n-butyl stearate | 8.0% |
| Wax | 125° F. paraffin | 3.0% |
| Drying-up time of 60 min. | | |

EXAMPLE 3

| Pigment | carbon black[3] | 3.0% |
|---|---|---|
| Resin | vinyl chloride-vinyl acetate copolymer[4] | 5.0% |
| Solvent | methyl isobutyl ketone | 45.0% |
| | ethyl acetate | 38.5% |
| Separating agent | n-butyl stearate | 8.0% |
| Wax | 135° F. paraffin | 0.5% |
| Drying-up time of 30 min. | | |

EXAMPLE 4

| Pigment | carbon black[3] | 3.0% |
|---|---|---|
| Resin | vinyl chloride-vinyl acetate copolymer[4] | 5.0% |
| Solvent | methyl isobutyl ketone | 45.0% |
| | ethyl acetate | 38.0% |
| Separating agent | n-butyl stearate | 8.0% |
| Wax | 135° F. paraffin | 1.0% |
| Drying-up time of 45 min. | | |

EXAMPLE 5

| Pigment | carbon black[3] | 3.0% |
|---|---|---|
| Resin | vinyl chloride-vinyl acetate copolymer[4] | 5.0% |
| Solvent | methyl isobutyl ketone | 40.0% |
| | ethyl acetate | 41.0% |
| Separating agent | n-butyl stearate | 8.0% |
| Wax | 135° F. paraffin | 3.0% |
| Drying-up time of 90 min. | | |

EXAMPLE 6

| Pigment | Cyanide Blue[5] | 3.0% |
|---|---|---|
| Resin | vinylidene chloride copolymer[2] | 2.2% |
| Solvent | methyl isobutyl ketone | 45.0% |
| | ethyl acetate | 41.0% |
| Separating agent | liquid paraffin[6] | 8.0% |
| Wax | 145° F. paraffin | 0.8% |

Drying-up time of 60 min.

EXAMPLE 7

| Pigment | Cyanine Green[7] | 4.0% |
|---|---|---|
| Resin | vinyl chloride-vinyl acetate copolymer[4] | 5.0% |
| Solvent | methyl isobutyl ketone | 5.0% |
| | methyl ethyl ketone | 50.0% |
| | ethyl acetate | 23.5% |
| Separating agent | n-butyl stearate | 6.0% |
| | n-butyl palmitate | 2.0% |
| | liquid paraffin[6] | 3.0% |
| Wax | microcrystalline wax | 1.5% |

Drying-up time of 30 min.

EXAMPLE 8

| Pigment | Hansa Yellow 3G[8] | 5.0% |
|---|---|---|
| Resin | vinyl chloride-vinyl acetate copolymer[4] | 5.0% |
| Solvent | methyl ethyl ketone | 40.0% |
| | ethyl acetate | 33.0% |
| | xylene | 6.0% |
| Separating agent | n-butyl palmitate | 9.0% |
| Wax | oxidized polyethylene wax[9] | 2.0% |

Drying-up time of 15 min.

EXAMPLE 9

| Pigment | Hansa Yellow 3G[8] | 5.0% |
|---|---|---|
| Resin | polyvinyl butyral[10] | 5.0% |
| Solvent | toluene | 35.0% |
| | ethanol | 42.5% |
| Separating agent | polyethylene glycol of molecular weight of about 200 | 11.0% |
| Wax | microcrystalline wax | 1.5% |

Drying-up time of 20 min.

EXAMPLE 10

| Pigment | Cyanine Green[7] | 4.0% |
|---|---|---|
| Resin | polyvinyl butyral[10] | 4.0% |
| Solvent | xylene | 31.0% |
| | ethanol | 50.0% |
| Separating agent | glycerin | 10.0% |
| Wax | 135° F. paraffin | 1.0% |

Drying-up time of 30 min.

EXAMPLE 11

| Pigment | Permanent Red F4R[1] | 3.0% |
|---|---|---|
| Resin | ethyl cellulose[11] | 3.0% |
| Solvent | benzene | 27.0% |
| | i-propanol | 30.0% |
| | ethanol | 24.0% |
| Separating agent | triethylene glycol | 11.0% |
| Wax | 125° F. paraffin | 2.0% |

Drying-up time of 30 min.

EXAMPLE 12

| Pigment | Permanent Red F4R[1] | 3.0% |
|---|---|---|
| Resin | vinyl chloride-vinyl acetate copolymer[4] | 4.5% |
| Solvent | methyl ethyl ketone | 36.0% |
| | ethyl acetate | 35.0% |
| | toluene | 10.0% |
| Separating agent | dioctyl phthalate | 11.0% |
| Wax | ceresine | 0.5% |

Drying-up time of 40 min.

EXAMPLE 13

| Pigment | Permanent Red F4R[1] | 3.0% |
|---|---|---|
| Resin | vinylidene chloride copolymer[2] | 2.0% |
| Solvent | methyl isobutyl ketone | 34.0% |
| | methyl ethyl ketone | 40.0% |
| | methoxybutanol | 2.0% |
| Separating agent | n-butyl stearate | 7.0% |
| | n-butyl palmitate | 2.0% |
| Wax | α-olefin of mp. of 30–40° C. | 10.0% |

Drying-up time of 20 min.

EXAMPLE 14

| Pigment | carbon black[3] | 3.0% |
|---|---|---|
| Resin | vinyl chloride-vinyl acetate copolymer[4] | 5.0% |
| Solvent | methyl isobutyl ketone | 40.0% |
| | ethyl acetate | 34.0% |
| Separating agent | n-butyl stearate | 8.0% |
| | liquid paraffin[6] | 2.0% |
| Wax | α-olefin of mp. 40–46° C. | 8.0% |

Drying-up time of 30 min.

EXAMPLE 15

| Pigment | carbon black[3] | 3.0% |
|---|---|---|
| Resin | vinyl chloride-vinyl acetate copolymer[4] | 5.0% |
| Solvent | methyl isobutyl ketone | 41.0% |
| | ethyl acetate | 34.0% |
| Separating agent | n-butyl stearate | 8.0% |
| Wax | α-olefin of mp. of 46–52° C. | 9.0% |

Drying-up time of 40 min.

EXAMPLE 16

| Pigment | Cyanine Green[7] | 4.0% |
|---|---|---|
| Resin | vinyl chloride-vinyl acetate copolymer[4] | 5.0% |
| Solvent | methyl isobutyl ketone | 5.0% |
| | methyl ethyl ketone | 44.5% |
| | ethyl acetate | 20.5% |
| Separating agent | n-butyl stearate | 6.0% |
| | n-butyl palmitate | 2.0% |
| | liquid paraffin[6] | 3.0% |
| Wax | α-olefin of mp. of 46–52° C. | 10.0% |

Drying-up time of 30 min.

EXAMPLE 17

| Pigment | carbon black[3] | 3.0% |
|---|---|---|
| Resin | vinyl chloride-vinyl acetate copolymer[4] | 5.0% |
| Solvent | methyl isobutyl ketone | 43.0% |
| | ethyl acetate | 36.0% |
| Separating agent | octyldodecanol | 8.0% |
| Wax | α-olefin of mp. of 52–56° C. | 5.0% |

Drying-up time of 20 min.

EXAMPLE 18

| Pigment | Cyanine Blue[5] | 3.0% |
|---|---|---|
| Resin | vinylidene chloride copolymer[2] | 2.2% |
| Solvent | methyl isobutyl ketone | 39.8% |
| | ethyl acetate | 36.0% |
| Separating agent | liquid paraffin[6] | 4.0% |
| | n-butyl stearate | 6.0% |
| Wax | α-olefin of mp. of 52–56° C. | 9.0% |

Drying-up time of 20 min.

EXAMPLE 19

| Pigment | Permanent Red F4R[1] | 3.0% |
|---|---|---|
| Resin | ethyl cellulose[11] | 3.0% |
| Solvent | benzene | 22.0% |
| | i-propanol | 30.0% |
| | ethanol | 26.0% |
| Separating agent | triethylene glycol | 11.0% |
| Wax | α-olefin of mp. of 52–56° C. | 5.0% |

Drying-up time of 20 min.

EXAMPLE 20

| Pigment | Cyanine Green[7] | 4.0% |
|---|---|---|
| Resin | polyvinyl butyral[10] | 4.0% |
| Solvent | xylene | 30.0% |
| | ethanol | 48.0% |
| Separating agent | ethylene glycol monooctyl ether | 10.0% |
| Wax | α-olefin of mp. of 56–62° C. | 4.0% |

Drying-up time of 20 min.

EXAMPLE 21

| Pigment | Hansa Yellow 3G[8] | 5.0% |
|---|---|---|
| Resin | vinyl chloride-vinyl acetate copolymer[4] | 5.0% |
| Solvent | methyl ethyl ketone | 40.0% |
| | ethyl acetate | 32.0% |
| | xylene | 6.0% |
| Separating agent | n-butyl palmitate | 9.0% |
| Wax | α-olefin of mp. of 56–62° C. | 3.0% |

Drying-up time of 15 min.

EXAMPLE 22

| Pigment | Permanent Red F4R[1] | 3.0% |
|---|---|---|
| Resin | vinyl chloride-vinyl acetate copolymer[4] | 4.5% |
| Solvent | methyl ethyl ketone | 35.5% |
| | ethyl acetate | 35.0% |
| | toluene | 10.0% |
| Separating agent | dioctyl phthalate | 11.0% |
| Wax | α-olefin of mp. of 62–68° C. | 1.0% |

Drying-up time of 15 min.

EXAMPLE 23

| Pigment | Hansa Yellow 3G[8] | 5.0% |
|---|---|---|
| Resin | polyvinyl butyral[10] | 5.0% |
| Solvent | toluene | 35.0% |
| | ethanol | 43.2% |
| Separating agent | polyethylene glycol of molecular weight of about 200 | 11.0% |
| Wax | Dialene 30 (mp. about 80° C.)[12] | 0.8% |

Drying-up time of 15 min.

EXAMPLE 24

| Pigment and Resin | Fuji IK Black[13] | 7.0% |
|---|---|---|
| | Fuji IK Blue[13] | 0.6% |
| Solvent | methyl isobutyl ketone | 48.4% |
| | butyl acetate | 37.0% |
| | methoxybutanol | 2.0% |
| Separating agent | hexylene glycol | 1.0% |
| | liquid paraffin | 3.0% |
| Wax | α-olefin of mp. of 62–80° C.[14] | 1.0% |

Drying-up time of 15 min.

EXAMPLE 25

| Pigment and Resin | Fuji IK Black[13] | 7.0% |
|---|---|---|
| | Fuji IK Blue[13] | 0.6% |
| Solvent | methyl isobutyl ketone | 45.3% |
| | butyl acetate | 38.1% |
| Separating agent | hexylene glycol | 1.0% |
| | liquid paraffin[6] | 3.0% |
| Wax | Dialene 208 (mp. about 39° C.)[15] | 5.0% |

Drying-up time of 15 min.

EXAMPLE 26

| Pigment | Permanent Red F4R[1] | 3.0% |
|---|---|---|
| Resin | vinylidene chloride copolymer[2] | 2.0% |
| Solvent | methyl isobutyl ketone | 32.0% |
| | methyl ethyl ketone | 40.0% |
| Separating agent | n-butyl stearate | 6.0% |
| | n-butyl palmitate | 2.0% |
| Wax | Dialene 208[15] | 15.0% |

Drying-up time of 30 min.

EXAMPLE 27

| Pigment | carbon black | 3.0% |
|---|---|---|
| Resin | vinyl chloride-vinyl acetate copolymer[4] | 5.0% |
| Solvent | methyl isobutyl ketone | 40.0% |
| | ethyl acetate | 30.0% |
| Separating agent | n-butyl stearate | 7.0% |
| Wax | Dialene 208[15] | 15.0% |

Drying-up time of 40 min.

EXAMPLE 28

| Pigment | Cyanine Blue[5] | 3.0% |
|---|---|---|
| Resin | acetyl cellulose[16] | 4.0% |
| Solvent | methylcellosolve acetate | 53.0% |
| | ethanol | 30.0% |
| Separating agent | liquid paraffin[6] | 8.0% |
| Wax | 145° F. Paraffin | 2.0% |
| Drying-up time of 30 min. | | |

EXAMPLE 29

| Pigment | Permanent Red F4R | 3.0% |
|---|---|---|
| Resin | ethyl cellulose | 3.0% |
| Solvent | benzene | 28.0% |
| | i-propanol | 30.0% |
| | ethanol | 24.0% |
| Separating agent | polyethylene polypropylene glycol[17] | 10.0% |
| Wax | 125° F. paraffin | 2.0% |
| Drying-up time of 30 min. | | |

In all the above EXAMPLES, writings or markings on the impervious surface were readily erased by wiping with cloth.

NOTES:

[1] Imperial Chemical Industries Ltd., C.I. 12335
[2] Asahi Dow K.K., vinylidene-acrylonitrile copolymer, Saran Resin F 220
[3] C.I. 77266
[4] Union Carbide Corp., Vinilyte YVHH
[5] Phthalocyanine Blue, C.I. 74160
[6] The Japanese Pharmacopeia
[7] Phthalocyanine Green, C.I. 74620
[8] Sanyo Shikiso K.K., Sanyo First Yellow 3G, C.I. 11670
[9] Nippon Seiro K.K., OX 1948
[10] Denki Kagaku Kogyo K.K., Denka Butyral 2000-L
[11] Dow Chemical Co., Ethocel
[12] Mitsubishi Kasei Kogyo K.K., mixture mainly comprising α-olefins of 20-28 carbons, average molecular weight of 319, mp. about 39° C.
[13] Fuji Shikiso K.K., dispersion of pigment in vinyl chloride-vinyl acetate copolymer in a weight ratio of about 1:1
[14] Mixture of 80% by weight of Dialene 30 and 20% by weight of 1-docosene
[15] Mitsubishi Kasei Kogyo K.K., mixture mainly comprising α-olefins not less than 30 carbons
[16] Daicel K.K., Daicel L 40, 55% acetylation and average polymerization degree of 160-170
[17] Sanyo Kasei Kogyo K.K., New Pole PP-2000, average molecular weight of 4000-5000

REFERENCE EXAMPLES

The same ink compositions as in EXAMPLES 1-29 were prepared except that they contain neither a wax nor an α-olefin, and their drying-up times were estimated in the same manner as in EXAMPLES. All the ink compositions thus prepared had a drying-up time of 5-6 minutes.

What is claimed is:

1. An erasable ink composition for writing on an impervious surface which comprises:
   about 40-90% by weight of an organic solvent;
   about 1-10% by weight of a pigment;
   about 1-25% by weight of a separating agent which is a non-volatile or only slightly volatile liquid at normal temperatures and has a lower vapor pressure than the solvent, and is soluble in the solvent;
   about 0.5-20% by weight of a synthetic resin which is soluble both in the solvent and a solution of the separating agent in the solvent, and is insoluble or only slightly soluble in the separating agent, said synthetic resin being at least one member selected from the group consisting of polyvinyl butyral, a vinyl chloride-vinyl acetate copolymer, a vinylidene chloride-acrylonitrile copolymer, ethyl cellulose, and acetyl cellulose; and
   about 0.05-20% by weight of a hydrocarbon wax.

2. An erasable ink composition as claimed in claim 1 wherein the hydrocarbon wax is selected from the group consisting of:
   paraffin wax;
   microcrystalline wax;
   polyethylene wax of molecular weight of about 1000-10000;
   ceresine;
   at least one α-olefin; and
   a mixture of these, and, wherein the separating agent is selected from the group consisting of:
   an ester of a fatty acid of 12-22 carbons and an aliphatic alcohol of 1-5 carbons;
   a phthalic acid diester of an aliphatic alcohol of 4-13 carbons;
   a dihydric alcohol of 2-8 carbons;
   a polyoxyalkylene glycol selected from the group consisting of polyethylene glycol of molecular weight not larger than about 600, polypropylene glycol of molecular weight not larger than about 5000, and polyethylene polypropylene glycol of molecular weight not larger than about 5000;
   an aliphatic alcohol of 8-22 carbons;
   a monoalkyl ether of ethylene glycol and diethylene glycol wherein the alkyl has 8-22 carbons;
   glycerin;
   liquid paraffin; and
   a mixture of these.

3. An erasable ink composition as claimed in claim 2 wherein the hydrocarbon wax is paraffin wax, microcrystalline wax, polyethylene wax, ceresine or a mixture of these, and the wax is contained in an amount of about 0.05-15% by weight based on the ink composition.

4. An erasable ink composition as claimed in claim 2 wherein the wax is an α-olefin or a mixture α-olefins which melts at temperatures of about 30°-80° C., and the wax is contained in an amount of about 0.5-20% by weight based on the ink composition.

5. An erasable ink composition as claimed in claim 3 wherein the wax is contained in an amount of about 0.1-5% by weight based on the ink composition.

6. An erasable ink composition as claimed in claim 4 wherein the wax is an α-olefin or a mixture α-olefins which melts at temperatures of about 40°-70° C., and the wax is contained in an amount of 0.5-15% by weight based on the ink composition.

7. An erasable ink composition as claimed in claim 2 wherein the polyethylene glycol is diethylene glycol or triethylene glycol and the polypropylene glycol is dipropylene glycol or tripropylene glycol.

* * * * *